United States Patent Office 3,736,234
Patented May 29, 1973

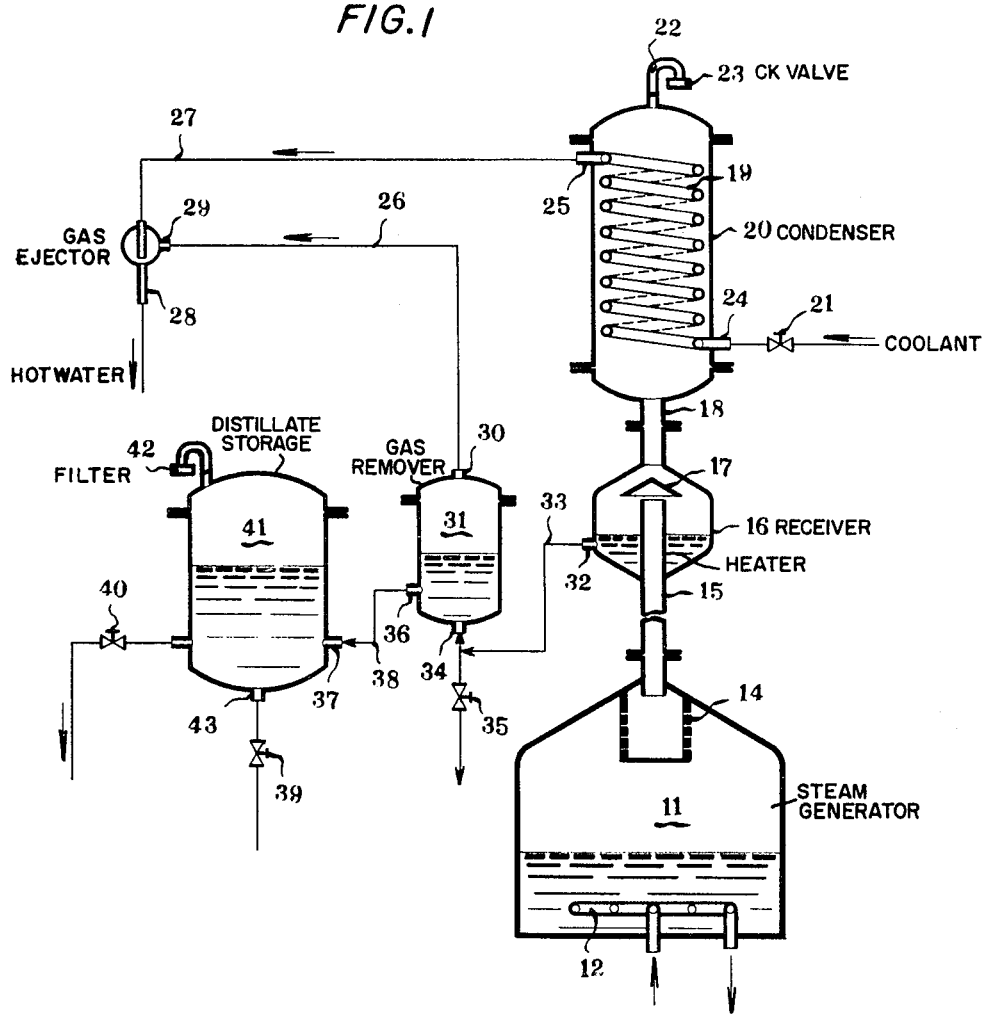

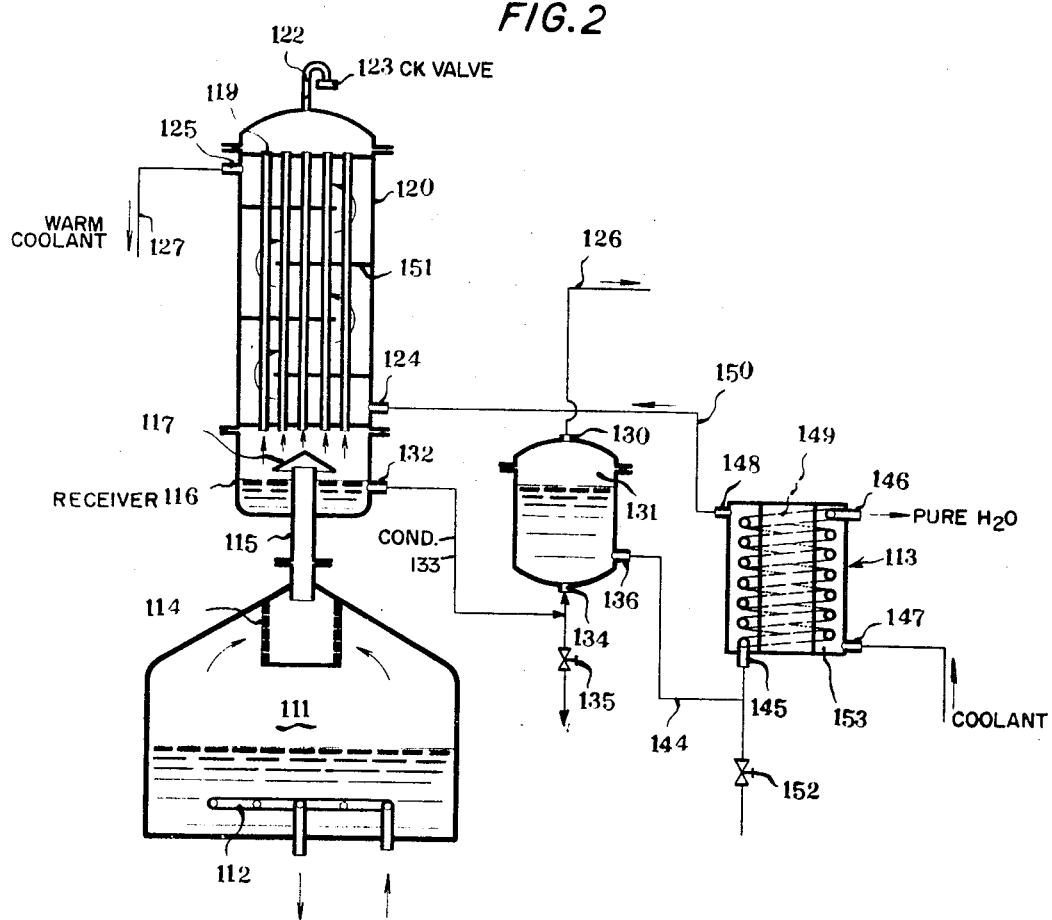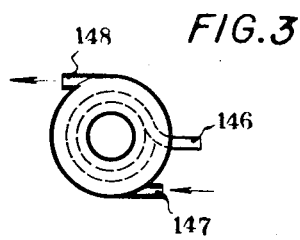

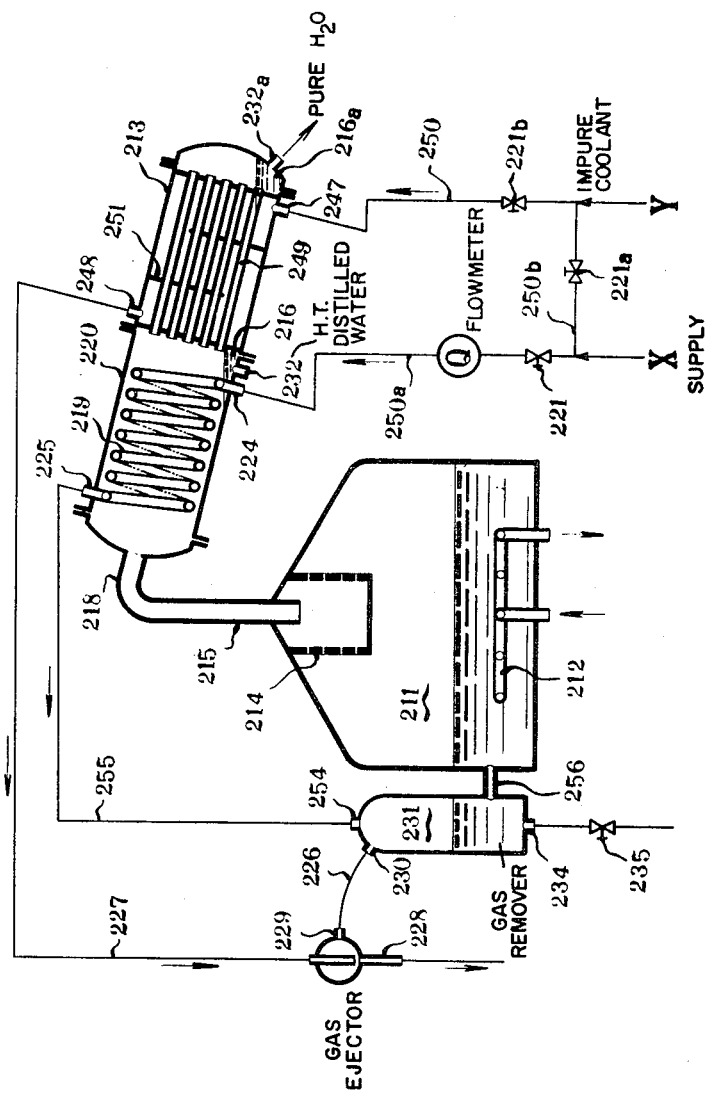

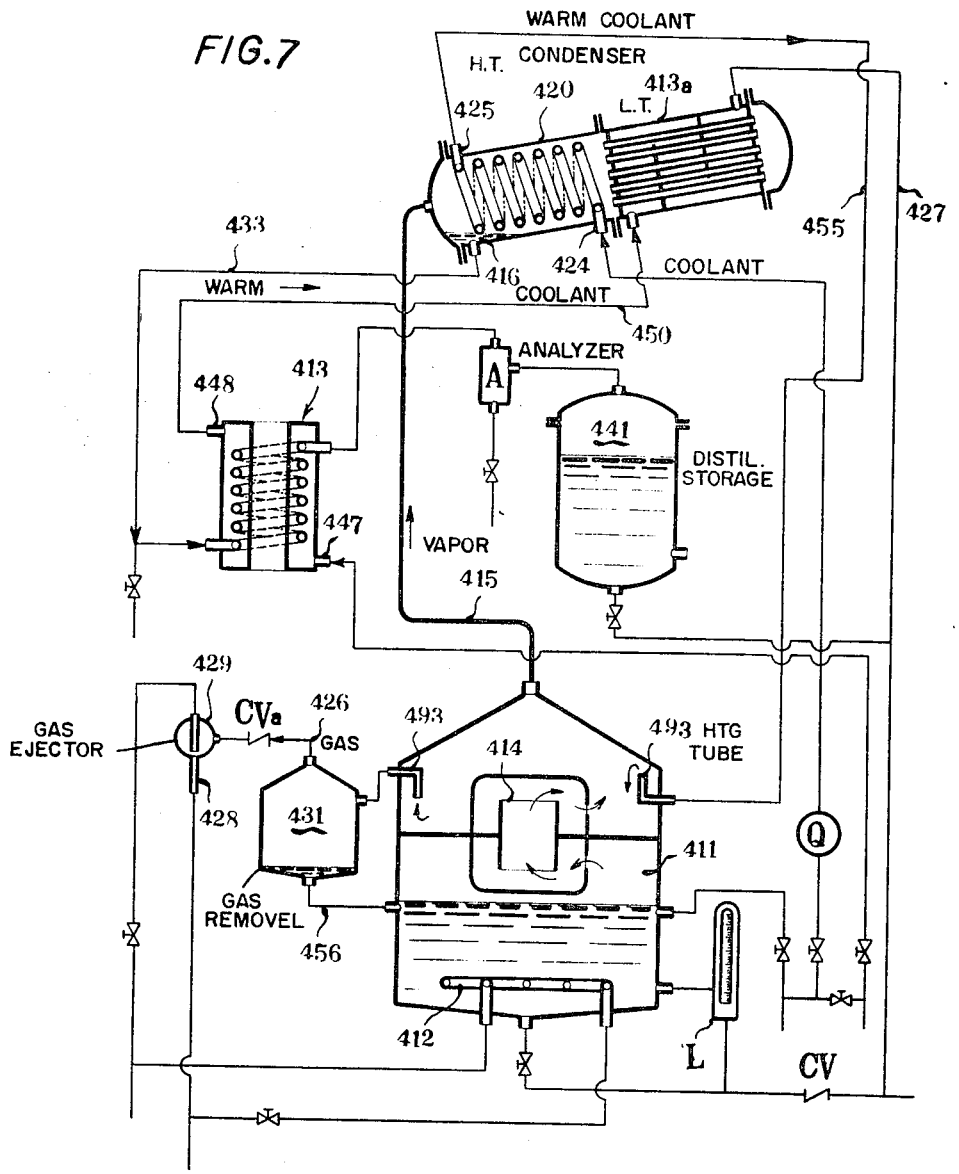

3,736,234
HIGH-PURITY DISTILLED WATER
PRODUCING APPARATUS
Shiro Miyamoto, Amagasaki, Japan, assignor to Toshin Industrial Machine Co., Ltd., Osaka, Japan
Filed Mar. 26, 1971, Ser. No. 128,309
Claims priority, application Japan, June 18, 1970,
45/60,561; Dec. 17, 1970, 45/127,209; Dec. 26,
1970, 45/126,250, 45/136,240
Int. Cl. B01d 3/00, 3/10, 3/14, 45/00, 39/06, 45/12;
F16t 1/00; F22b 37/26
U.S. Cl. 202—185 R     2 Claims

ABSTRACT OF THE DISCLOSURE

The present invention relates to an improvement of an apparatus for producing high-purity distilled water which comprises a mist separator means mounted in a steam generator, a tubular member for introducing steam into a condenser, upper portion of said tubular member being adapted to heat-exchange said steam with liquid condensed at substantially high temperature and collected near the upper portion, at least one liquid receiving means arranged within the condenser for receiving required amount of the liquid, and at least one gas removing container means in which occluded gas is continuously evacuated by a gas aspirating means.

---

The present invention relates to an improvement of an apparatus for producing high-purity distilled water, particularly distilled water for injection.

Various kinds of salts and gases are contained in the usually used water, so that when heated, those substances possessing a lower boiling point vaporize first. They will be vaporized in a large amount from the initial stage of distillation for a certain period of time, and are introduced to a cooler together with steam. They are then cooled for condensation together with the steam and remain in the distilled water until they become saturated in accordance with the temperature at the time of condensation, thereby deteriorating the purity of the distilled water.

The so-called initially distilled water, which was obtained during the first 20–40 minutes of distillation by the usual distilled water producing apparatus, used to be discarded due to its excess inclusion of impurities.

A high-purity distilled water collecting apparatus which does not require the discarding of the initially distilled water invented by me has been disclosed in the Japanese Patent No. 525,461 (Publication No. 7,688/68).

The present invention relates to an improved apparatus over the one shown in the aforesaid patented invention.

When distillation is continued, the water level in a steam generator descends. Therefore, it is necessary to feed water in a suitable amount according to that lost by vaporization, consequently impurities are added along with the feed water.

In this connection, the substances which are liable to vaporize will be brought into the cooler and dissolved into the distilled water.

As such time, there are cases where the substances which do not readily vaporize will also, during the boiling in a distillation still, be mixed into the distilled water in forms of splashes or drops. This also causes a substantial deterioration of purity of the distilled water.

In order to eliminate the said disadvantages, most of the conventional apparatuses were planned so as to improve the purity of distilled water by repeating the distillation several times, however such operation wastes a lot of latent heat for vaporization.

Therefore, the object of the present invention is to provide an improved high-purity distilled water producing apparatus which comprises a receiver in a condenser for keeping condensed water at the highest possible temperature, at least one gas remover for sufficiently removing readily vaporizable substances, and a mist separator for preventing splashes to mix in.

Further, the other object of the present invention is to provide an improved high-purity distilled water producing apparatus which is simple to manufacture and operate, and is capable of continuously producing the high-purity distilled water and achieving a good thermal efficiency.

The function of the conventional type distilled water collecting apparatus was to heat the water in a steam generator, introduce the generated steam to a heat exchanger, deprive it of latent heat for vaporization to produce condensed water, and simply discharge said water or store it.

The present invention is to provide an improved distilled water producing apparatus, the improved function of which is to first introduce the distilled water or the feed water of the highest possible temperature into the gas remover. And, after continuous extraction of the saturated vapor at a high temperature, the distilled and extracted water is fed into the storage tank or the steam generator.

Generally, distilled water collected at a high temperature is of high purity. For example, if the steam generated at 100° C. is condensed on a cooling surface of 99.99° C., the quality of the distilled water will be theoretically of high purity, supposing that the material forming the cooling surface, for instance, glass or stainless steel, is of no effect to the water distillation, however such an idea of condensing water at the temperature about 100° C. is not applicable for industrial use.

It will be understood, therefore, that gas solubility in water essentially depends on the temperature of water, as it approaches the boiling point, since, for example, it is practically impossible to produce distilled water of exactly 100° C. The present invention is to produce the distilled water of the highest possible temperature. When said distilled water is introduced into a closed vessel, it is always under the saturated vapor pressure of its temperature, however, knowing that occluded impure gas is also contained therein, said gas is first removed by extraction, and the water is either fed into the storage tank or treated to a normal temperature by passing through the cooler. As a result, when the electric resistance value of the distilled water collected by the conventional method has been 700,000 Ω cm. (in ohms per cm. cube, see Handbook of Chemistry and Physics, Chemical Rubber Publishing Co. 39 ed., 1958, p. 2349) at the most, that collected from the apparatus of the present invention, which is additionally equipped with the gas remover, is capable of showing the electric resistance value more than 1,500,000 Ω cm.

It is obvious from this significant effect that the apparatus of the present invention provides the new industrial utilization.

The extraction in the gas remover is sufficiently performed in the following manner. The drainage under a slight pressure at the temperature of about 60° C.–70° C., developed due to heat exchange between the cooling water and the vaporized steam, is fed into the aspirator, thereby establishing therein low pressure in a hollow portion which is then connected with the gas remover to let the extraction function in said remover.

Further, it is easily possible to further increase the degree of purity under the conditions of high temperature, and here is how such high-temperature high-purity distilled water can be made into the conveniently usable normal-temperature high-purity distilled water according to the present invention. When high-temperature high-purity distilled water is cooled to the normal temperature according to the usual cooling method, said water absorbs and dissolves liberated gases in air to the saturation degree of its temperature, whereby quality of the water is extremely deteriorated. The method according to the present invention is to have the distilled water rise along a wound tube inside the doughnut type cooler in full capacity without giving it the opportunity to contact with air. And, since the cooling water inlet and outlet are constructed in such manner that the cooling water will definitely circulate about the outer periphery of the wound tube, said distilled water is cooled rapidly in a short period of time with high efficiency. The high-purity normal-temperature water can thus be collected from the wound tube top portion. The improved apparatus according to the present invention is extremely convenient as it can also be operated more simply by omitting the cooling process in case the distilled water should be used at the high temperature without cooling off to the normal temperature.

Furthermore, in an apparatus where a liquid in a closed vessel is heated to boiling point and dewatered by a separator or in a vaporization drops collecting apparatus, the phenomenon of splash occurring is inevitable.

In order to separate said drops to prevent them from entering the condenser, mist separating means is provided in the distilled water producing apparatus according to the present invention. Said means is adapted to let the drop-containing vaporization steam strike the obstructions many times without affecting vaporization ability and, at the same time, substantially diverting its flowing direction and changing the speed of the current.

Especially, it is possible to provide a large size distillation apparatus while using the mist separating means to eliminate the above mentioned disadvantages.

In the distilled water producing apparatus consisting of the heater, the steam generator and the condenser, therefore, the improved high-purity distilled water producing apparatus according to the present invention is characterized in comprising a mist separator means mounted in the steam generator, a tubular member connecting the steam generator and the condenser for introducing high-temperature steam free from mist, the upper portion of said tubular member being adapted to heat-exchange said steam with liquid which is condensed at substantially high temperature and collected near said upper portion, at least one liquid receiving means arranged within said condenser for receiving a required amount of said liquid, and at least one gas removing container means in which occluded gas is continuously evacuated by a gas aspirating means.

In order that the disclosure will be more fully understood and readily carried into effect, the following detailed description is given with reference to the accompanying drawings in which:

FIG. 1 is a diagrammatical view of a high-temperature high-purity distilled water producing apparatus according to the present invention;

FIG. 2 is a diagrammatical view showing a modified embodiment of the high-purity distilled water producing apparatus which is additionally equipped with the doughnut type cooler for cooling, without affecting the purity, of the distilled water;

FIG. 3 is a plan view of said doughnut type cooler;

FIG. 4 is a diagrammatical view showing another embodiment of the high-purity distilled water producing apparatus capable of optionally collecting the distilled water either at the high temperature or normal temperature;

FIG. 7 is a flow chart showing a modified embodiment of the high-purity distilled water producing apparatus.

Figure 5:
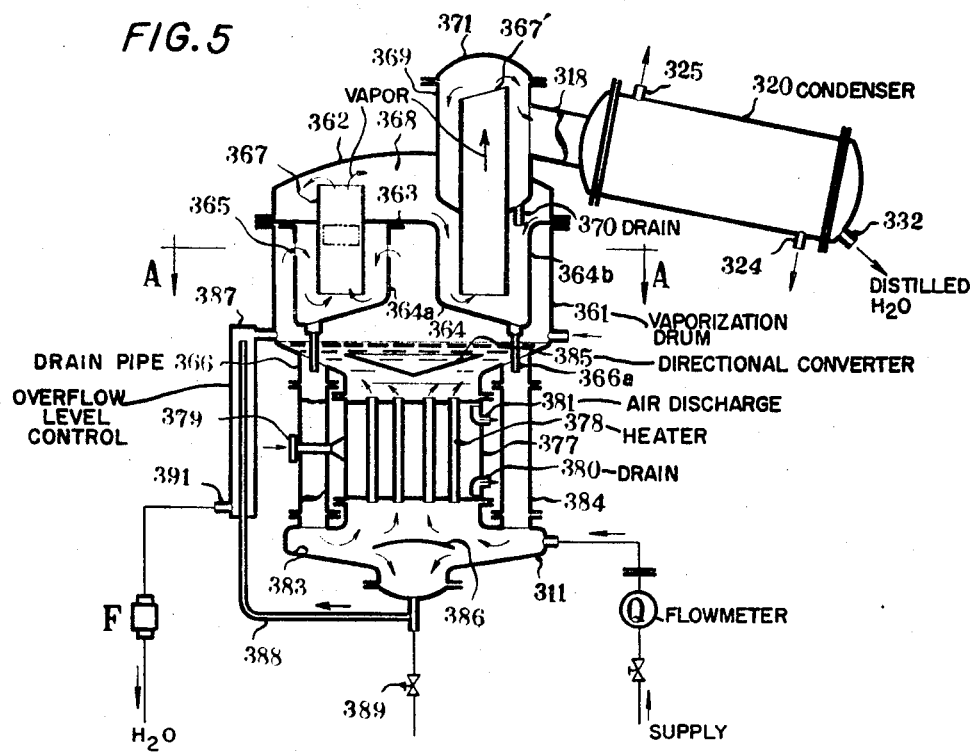
FIG. 5 is a diagrammatical view showing a major portion of a modified embodiment of the high-purity distilled water producing apparatus incorporating mist separator means particularly effective for a large sized apparatus.
Figure 6:
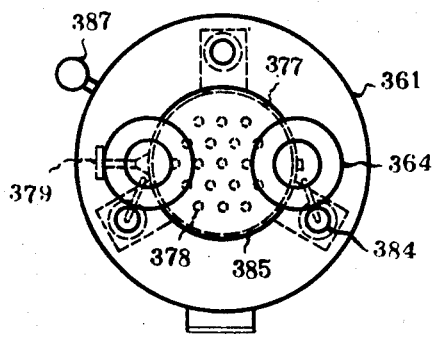
FIG. 6 is a plan view taken along the line A—A of FIG. 5, of the apparatus according to the present invention.

Referring to FIG. 1 a steam generator 11 is provided with a heating means at the lower portion thereof and a steam introducing tubular portion 15 at its upper portion.

The said steam introducing tubular portion 15 is inserted into a receiver 16 arranged above said steam generator 11, the upper end of the said tubular portion 15 is opened for introducing the steam into said receiver 16, and the contacting portion between the said tubular portion 15 and the said receiver 16 is connected tightly so as not to allow any leakage.

The length between the upper opening and the contacting portion of the said tubular portion 15 is adapted to receive the required amount of liquid around the said tubular portion and have said liquid heated with the steam from the distillation still 11, that is, carry out a heat exchange between the generated steam and the required amount of liquid in order to maintain the liquid at the required temperature, especially the nearest to 100° C.

Consequently, the occluded vaporizable substances will be sufficiently vaporized from said liquid.

The lower end of the said tubular portion 15 is securely connected to the said steam generator 11, the opening thereof being slightly protruded inside the steam generator 11.

A cylindrical mist separator means 14 is provided in the said steam generator 11 under the lower opening of the said tubular portion 15, made of porous materials such as sintered metal, porcelain and others, and is constructed so as to prevent boiling splashes or mist from entering the said receiver 16.

A baffle plate 17 is further provided above the upper opening of the said tubular portion 15 to divert the flowing direction of the steam for heating the surface of said liquid around the tubular portion 15, thus accelerating the vaporization of occluded gases from the liquid surface.

Further, a condenser 20 is provided above the said receiver 16 and is connected to the receiver 16 with a small diameter pipe 18.

The said condenser 20 is of a cylindrical form covered with head plates, the central portion thereof being connected with one end of a pipe 22 while the other end of said pipe 22 being equipped with a check valve 23 openable with a proper pressure.

A wound tube 19 is provided in the said condenser 20, through which, by opening a valve 21, the cooling water introduced from a water inlet 24 at the lower portion and discharged from an upper outlet 25 is heat-exchanged to condense the steam.

The hot water discharged from said outlet 25 passes through piping 27, and is ejected out further through a gas absorption means such as an aspirator 28.

A hollow portion 29 in the aspirator 28 is adapted to provide a low pressure resulted from passing of warm water.

An outlet nozzle 32 is provided on the side portion of the said receiver 16 at a lower position, in leveling height, than the upper opening of the said tubular portion 15. Said nozzle 32 is adapted to introduce the liquid from the receiver 16 to a gas remover 31 through a piping 33 and an inlet nozzle 34 of said gas remover 31 by means of head of water.

There is further provided an outlet nozzle 36 on the lower side portion of said gas remover 31 for introducing the distilled water to a distilled water storage tank 41 through piping 38. An upper nozzle 30 functions to introduce the gas in the gas remover 31 to the low pressure portion 29 of said aspirator 28 through piping 26.

A valve 36 is provided below the nozzle 34 in such manner that they are connected by means of a short pipe, and said valve 35 may also be used for analysis of distilled water, purge of wash water, and other purposes.

The piping 38 leading from the nozzle 36 of the said gas remover 31 is connected to an inlet nozzle 37 provided on the lower side of the storage tank 41.

The said storage tank is of a closed cylindrical shape and is provided with a ventilation mechanism such as disinfectant filter 42 at the upper portion thereof and an outlet valve 40 on the opposite side of said nozzle 37 at the lower portion thereof.

It is preferable to plan the top of the closed gas remover to be somewhat higher than the nozzle 32 and to be in the same level with the top of the distilled water storage tank 41.

Further, the aspirator 28 is located at position lower than the cooling water upper outlet and higher than the gas remover 31.

Referring to FIG. 1, the functions of the said apparatus will be more clearly defined as follows.

The water in the steam generator 11 is heated by a heater 12 and then vaporized as a steady steam. The steam is led into the piping 15 passing through the mist separator means 14, strikes the baffle plate 17 inside the receiver 16 which is connected with the heat exchanger, and meanderingly reaches the condenser 20 going round the baffle plate 17 and the pipe 18. The said steam is then cooled inside the condenser 20 by the cooling water flowing inside the wound tube 19, thereby losing a great amount of heat. It then condenses in a corresponding amount of heat loss at a high temperature not less than an average value of 40° C., descends in form of high temperature distilled water, and is received in the receiver 16. On one hand, the temperature of the pressurized water inside the wound tube 19 is continuously raised by means of heat exchange, enters the aspirator 28 through the piping 27, and is continuously discharged by producing weak vacuum on a mechanism of the aspirator.

Meanwhile, the high temperature distilled water being received in the receiver 16 gradually increases, and any amount exceeding the horizontal line at the location of the outlet nozzle 32 is continuously transferred into the closed gas remover 31 after issuing from the said nozzle 32 and passing through piping 33. (Also, if necessary, it can be discharged from the valve 35 provided on piping extending out from the gas remover.) The high temperature distilled water transferred into the gas remover 31 is further transferred for storage into the distilled water storage tank 41 through the piping 38 stretching out from the outlet nozzle 36 provided on the side portion of the gas remover 31, and can be freely taken out from the outlet valve 40. However, as briefly described before, the closed gas remover 31 is intended to provide the distilled water in a condition of fully free from redissoluble contaminants in the storage tank 41 in coordination with the function of the aspirator 28. To explain this in more detail; the distilled water which is transferred from the receiver 16 to the gas remover 31 is not yet the one of high purity, and while it is kept in the gas remover 31, the aspirator 28 functions, and extracts the impure gas which may be redissolved when the high temperature distilled water becomes the normal temperature distilled water and becomes contained in the saturated vapor, said impure gas is then absorbed and ejected by the vacuum created by the draining water. This is how the high purity water quality of the normal temperature distilled water can be obtained and maintained. The characteristic of the said apparatus lies in its efficiency wherein the extremely high purity distilled water can be continuously obtained with very simple modification. In the said apparatus the aspirator 28 is connected either vertically or horizontally with the gas remover 31 and the storage tank 41.

In FIG. 2 another embodiment of the present invention incorporating a doughnut type cooling means for cooling the high-purity distilled water is shown.

As illustrated in the drawing, a steam generator, 111 comprising a heater 112 is provided, a long pipe 115 extending therefrom is extended into a receiver 116 located at the lower end of a condenser 120, a steam baffle plate 117 is placed in said receiver 116 right above the upper end of the long pipe 115, a plurality of condensing tubes 119 are arranged above the said receiver 116 in the condenser 120, three or four baffles 151 intersect the tubes 119, said screens 151 being successively placed in a zigzag form, a cooling water feeding inlet 124 and a discharging outlet 125 are provided on said condenser 120 at the lower end of its side portion and the upper end, respectively, a distilled water storage tank 131 possessing a gas removing pipe 126 located at the lower portion than the lower ends of the condensing tubes 119 is provided near the receiver 116, a doughnut type heat exchanger 113 is further placed near the storage tank 131, a valve 135 fixed on piping 133 extending out from an outlet nozzle 132 of the receiver 116 connected with the distilled water storage tank 131, a valve 152, fixed on piping 144 extending from an outlet nozzle 136 of the distilled water storage tank 131 and connected with an inlet 145 of a wound tube 149 provided in the heat exchanger 113, a tangential feeding water inlet 147 and a tangential draining water outlet 148 are provided to a hollow cylinder shape tank 153 of the heat exchanger 113, and piping 150 is provided for connecting the outlet 148 with the cooling water feeding inlet 124 of the condenser 120. Further in the drawing, the numeral 153 represents the hollow cylinder of the heat exchanger 113, 123 a check valve and 146 a distilled water discharger.

The functions of the said apparatus are described as follows. The water contained inside the steam generator 111 vaporizes by being heated with the heater, the steam thus generated rises in the pipe 115, said steam strikes the steam baffle plate 117 and rises further making a detour about the outer periphery of the plate 117, and enters the condenser 120. Said steam then comes in contact with a plurality of the condensing tubes 119, is cooled and condensed at the relatively high temperature of preferably 50 to 70° C. in average and drops into the receiver 116 located at the lower portion of the condenser 120. Meanwhile, the dropping distilled water comes in contact with the vaporization steam which is rising from the pipe 115, and is raised to a high temperature when collected at the receiver 116. The distilled water thus collected at the receiver 116 is drawn out from the outlet nozzle 132 when the water level becomes higher than the location of the nozzle 132, is introduced through inlet 134 after passing through the piping 133, and enters a gas remover 130 which is fixed with the gas removing pipe 126 at the top portion. The distilled water accumulated at the storage tank 131 is let out from the outlet nozzle 136, flows into the piping 144 preserving its high temperature and proceeds into the wound tube 149 of the doughnut type heat exchanger 113 provided near the storage tank 131. Said distilled water is extremely efficiently cooled in the wound tube with the cooling water which is being tangentially fed from the inlet 147 and discharged from the outlet 148, and can be either taken out in the required amount from the discharger 146 or introduced into the storage tank. The distilled water preserving its high temperature all this time in the closed gas remover 130 is forcibly deprived of the impure gas by connecting the gas removing pipe to an absorbing side of an aspirator (not shown in FIG. 2), thus being made into higher purity distilled water. (Otherwise the gas removing pipe 126 is kept open under a suitable condition.) Further, the cooling water for cooling the wound tube 149 is introduced to the inlet 124 of the condenser 120 after being discharged from the outlet 148 of the heat exchanger 113 and passed through the piping 150. Since said heat exchanger 113 will only change the temperature of the distilled water from high to normal, it is capable of mildly cooling the rising vapor with the slightly warmed cooling water by means of the condensing tubes 119, therefore, it has a merit of being capable of producing the distilled water at a higher temperature when compared with the conventional type apparatus. That is, the present apparatus is capable of continuously providing the high-purity distilled water with an equal cooling water amount despite its simple composition. The present apparatus is capable of continuously collecting the normal-temperature high-purity distilled water which is highly efficiently changed from the high-temperature high-purity distilled water, and its characteristic is to make, in the condenser 120, the dropping distilled water come sufficiently into close contact with the rising high temperature vaporization steam and collect the drops in the receiver 116. Then, after removing the impurities therefrom inside the gas remover 130, the water rises rapidly in full capacity in the wound tube 149 located in the doughnut type heat exchanger 113, and since the tangentially entering cooling water exactly circulates about the outer periphery of the wound tube 149, the through rate increases and highly efficient rapid cooling is performed.

Another embodiment is shown in FIG. 4 a high-purity distilled water producing apparatus comprising mainly of a gas remover 231 which is capable of extracting gas from supply water and of a cooler 213 integrally composed with a condenser 220 in order to efficiently utilize heat energy and to provide a compact apparatus, and said apparatus, as a whole, is capable of collecting the high-purity distilled water a both high and low temperatures.

The structure of the said apparatus is comprising a steam generator 211 containing therein a heat generating heater 212 and a mist separator means 214, piping 215 provided at the upper portion of said steam generator, said piping 215 being led to a heat exchanger 220 provided in the first half portion of an inclined condenser, a wound tube 219 installed in said heat exchanger 220, one end of the wound tube 219 being connected with a connecting port for the vaporization supply water 224, the other end of the wound tube 219 being connected with piping 255 which is extending to the closed gas remover 231, a high temperature distilled water discharger 232 provided at one end of the said heat exchanger 220, a plurality of condensing tubes 249 installed in the rear half portion of the condenser, one or more pieces of screens 251 arranged at the required places among these condensing tubes 249, a distilled water discharger 232a fixed at a water collecting portion 216a a located in said rear half portion, a cooling water outlet 248 fixed at the upper end of the opposite side, piping 227 extending from said outlet 248, said piping 227 being adapted to extend outside through an aspirator 228, a branch piping 226 extending from the aspirator 228 to connect with the gas remover 231, said wound tube 219 being connected with a water feeding pipe 250a through the connecting port for the vaporization supply water 224, a flow meter Q and a valve 221 fixed to said pipe 250a, a cooling water inlet nozzle 247 and an inflowing pipe 250 connected with said nozzle 247 extending from the other end of the condenser, a valve 221b fixed to said pipe 250, and piping 250b fixed with a valve 221a provided between the water feeding pipe 250a and the valve-controlled pipe 250.

The functions of the said apparatus are explained as follows.

First of all, steam is generated in the steam generator 211 with the heater 212, said steam being deprived of mist by the mist separating baffle plate 214. The pure steam thus obtained is passed through the high temperature heat exchanger 220 prior to being led into the condenser, and, with said heat, the vaporization supply water fed into the wound tube 219 through the flow meter Q under about a normal tap water pressure will be thoroughly heated. That is, if the amount of feeding water is controlled to approximately equalize with the vaporized amount in the steam generator 211 by means of the flow meter Q and the controlling valve 221, the supply water can be continuously and automatically warmed up to a desired temperature by properly determining the surface area and current speed of the wound tube 219. Meanwhile, the vaporization steam entered the high temperature heat exchanger 220 becomes in contact with the supply water by means of the wound tube 219, the vaporization steam condenses in conformity with the amount of heat lost, and the high temperature distilled water thus obtained can be taken out from the discharger 232. Alternatively, if the discharger 232 is tightly closed, said high temperature distilled water combines with the distilled water produced in the condenser and can be taken out from the discharger 232a.

Further, the water passed through the wound tube 219 readily rises to nearly 100° C., enters the air-tight gas remover 231 passing through the piping 255, and flows into the steam generator 211 through a connecting tube 256.

Usually, a main pipe (not illustrated), which feeds good quality tap water or pure water, is connected to a source water pipe for the vaporization supply water X, while another main pipe (not illustrated), which feeds impure well water or tap water or industrial water, is connected to a source water pipe for cooling Y. However, in case the qualities of water fed to the source water pipe X and the source water pipe Y are of identical water of a fine quality, either one of these pipes X or Y can be connected to one of the main pipes, while closing the end of the other pipe and opening the transfer valve 221a. Then, one of the flowings of water, passing through the flow meter Q, becomes a proper quantity supply water and flows into the wound tube 219, while the cooling water, by adjusting the valve 221b, flows into the main body of the condenser from the nozzle 247 in a proper quantity, and is injected by pressure into the aspirator 228 through the cooling water outlet 248 and the piping 227. Thus, a proper negative pressure is generated in the aspirator 228, and consequently an impure gaseous body which is vaporized in the high temperature hot water continuously flowing into the gas remover 231 is absorbed into a low pressure portion 229 inside the aspirator 228 passing through the branch piping 226 and is issued outside from the outlet of the said aspirator together with the cooling drainage water.

Since, according to the present embodiment, the heat exchanger for the vaporization supply water is integrally equipped with the first part of the condenser as mentioned above, it is not necessary to separately provide an equipment for preheating of supply water as in conventional cases. Further, by installing the wound tube in the said high temperature heat exchanger for preheating the supply water, the supply water comes in direct contact with the steam generated in the steam generator, thereby the supply water can be preheated to a high temperature. Thus, it becomes possible to easily eliminate the impurities deteriorating the quality of water without causing heat loss at all. This represents the important condition possessed by the present apparatus wherein a good quality distilled water is continuously collected. Further, since the flow meter is attached to the water feeding pipe connected with one end of the wound tube in the heat exchanger as mentioned above and a transfer valve-controlled tube is provided for connecting the said water feeding pipe with the cooling water inflowing pipe connected to the condenser, it is not only possible to feed a small amount of good quality source water in a properly necessary amount for supply by the flow meter to the former pipe with said transfer valve being closed and to feed a large amount of inferior quality source water to the latter pipe as normally practiced, if both source waters should be of good quality, then the feed water can be sent from one of the source water main pipes to one of the inlets of either pipe with the said transfer valve being kept open, and it is possible to feed source water to both pipes, the water feeding pipe and the cooling water inflowing pipe, through the aforementioned valve-controlled tube, thus is capable of simplifying the operation of the present apparatus. Furthermore, the high temperature water which is discharged from the heat exchanger is adapted so as to be led into the gas remover and then to the steam generator, and, in the meantime, the cooling water which is discharged from the condenser is injected into the aspirator. As the gas remover and the aspirator are connected with each other, the impure gaseous body contained in the hot water introduced into the gas remover will be absorbed by means of the negative pressure created inside the aspirator. Thus the present apparatus is significantly effective wherein it is capable of continuously supplying the extremely superior and high temperature supply water to the steam generator.

Another embodiment illustrated in FIG. 5 shows an improvement of a mist separator means particularly suitable for a larger type distillatory apparatus.

The structure of the present apparatus will be more fully elucidated by the following detailed explanation based on FIG. 5. This is the larger type distillatory apparatus comprising a vaporization drum 361, a dashboard 363 which is provided for somewhat separating said drum 361 into an upper portion, namely a cover portion 362, and a lower portion, namely a hanging type liquid catchers locating portion 364, two hanging type liquid catchers 364a and 364b bilaterally located at a certain distance from the center portion of said dashboard 363, said catchers being hangingly formed inside the drum 361, a plurality of steam inlets 365 opening on the side of the liquid catcher 364a at the points adjacent to the dashboard 363 and the drum 361, said inlets being provided in sufficient numbers so as to be able to create a designed velocity of flow, further, the bottom plates of both hanging type liquid catchers, 364a and 364b are shaped to be inclining towards the drum enabling water drops to fall closely along the drum inner wall and discharge through a drainpipe 366, and a through steam piping 367 being fastened to the said dashboard 363 and vertically hanging inside the hanging type liquid catchers 364a and 364b enabling the descending veporization steam entered from the said steam inlets to climb through said piping 367 and rapidly proceed into a larger chamber 368 along the side of the said piping 367 after changing its course for 180°. That is, said steam is blown up through the steam piping 367. Its proceeding is stopped by the dashboard 363, and, therefore, it is induced to fall inside the larger chamber 368 located over the dashboard 363, but is again blown up through a through steam piping 367' installed in the hanging type liquid catcher 364b in parallel with said steam piping 367 along the side of the drum 361, and said through steam piping 367' is provided with a piping cover 371 and a smaller chamber 369 so as to enable said steam to change its course for 180°. A condenser 320 is provided at the side of the piping by means of an anchoring cylinder 318. An outlet nozzle 370 extends from the smaller chamber 369 at the drum 361 side to be in connection with the hanging type liquid catcher 364b and further with a drainpipe 366a. And, the condenser 320 is provided with a distilled water discharger 332, a cooling water inlet 324 and a cooling water overflowing nozzle 325. Further, the above mentioned drainpipes 366 and 366a are both in connection with the larger size drainpipes 384 equipped at the outer side of a calendria type heating boiler 377, a plurality of vertical heating tubes 378 are provided about the inner shaft portion of the said heating boiler 377, a heating steam inlet 379, a drain discharger 380 and an air discharger 381 are provided on the required positions of the outer peripheral wall of said heating boiler 377, and the said heating boiler is integrally constructed with the vaporization drum 361 which is diametrically larger than the heating boiler 377.

Furthermore, a bottom 383 possessing the same diameter as the heating boiler 377 is fastened to the lower end of the said heating boiler 377, several drainpipes 384 are placed side by side at the outer periphery of the heating boiler 377 between the vaporization drum 361 and the bottom of boiler 383, a direction converter 385 is arranged in the vaporization boiler 361 right above the heating tube group, a baffle plate 386 is installed in a shape of tower on the center and right above the bottom of boiler 383, a connecting piping 388 is raised from the lowermost bottom portion of the bottom of boiler 383 to the side portion of the drum 361 inserting thereat into a condensed water piping 387 which is downward fixed along the side portion of the vaporization drum 361 enabling said piping 388 and said piping 387 come to connect with each other, and provide a water exhaust 391 at the lower end of said condensed water piping 387 so that the water can be maintained in the vaporization drum 361 to the same level of the upper end of the connecting piping 388. Further, the numeral 389 represents an exhaust valve, the letters Q a flow meter and F a flowing indicator.

The present apparatus is composed as mentioned above and functions as follows. During the travelling of the vaporization steam, as many chances as possible are given for bubbles to break, said moisture-containing vaporization steam is made to strike the obstructions and its flowing directions are changed enabling it to make the 180°-turn for several times simultaneously changing also the velocity of flow, and despite the current resistance, the originally aimed vaporization ability is not hindered at all. Especially, the bottom parts of the hanging type liquid catchers, 364a and 364b, are made to incline towards the side walls of the drum 361 enabling the water drops to flow down. The vaporization steam entered from the steam inlets 365 is stopped by the dashboard 363, turns down into the hanging type liquid catcher, is induced to change its direction for 180° climbing through the steam piping 367, and considerable velocity is given at each such time to facilitate its flow. Although it cannot be helped that a large amount of splash accompanying water drops enter at that time together with the steam, the relatively lighter vaporization steam separates from the heavier one during the process of changing the direction for 180°, and the heavier one discharges through the drainpipe 366. The lighter steam rises through the steam piping 367, is sent into the larger chamber 368 compared with the dashboard 363 and the mist therefrom is thoroughly separated in said chamber. Further, the next hanging type liquid catcher 364b again forces the 180°-turn, thus a lot of forcible turns are applied to the movement of the vaporization steam, thereby enabling the precise mist separation for achieving an effective function. And, the configuration of the upper portion of the steam piping 367' and its adjacent cover is represented in such a way that the inclined section of the top of the said piping 367' is higher on the condenser 320 side and lower on the opposite smaller chamber 369 side enabling the flow of steam to inevitably make detour for entering the condenser 320 and to be collected from the discharger 332.

Not alike the various types of the conventional larger type boilers, the said apparatus is comprised of the heating boiler wherein the heating tube group is vertically installed, the vaporization drum which is diametrally larger than the said boiler is connectively provided over the heating boiler, the bottom of boiler being fastened to the lower end of the heating boiler, the drainpipes being provided between the vaporization drum and the bottom of boiler, and, since said drainpipes are placed on the outer side of the heating boiler, it becomes possible to reduce the size of the heating boiler. Further, the fluid can certainly descend through the drainpipes into the said heating boiler without receiving any bad influence, and the circulation of the material water is smoothly performed, thus it is possible to obtain a significant effect in the larger type distillatory apparatus. As a result, it is possible to reduce the bulk of installation and to prevent and reduce the amount of accompanied splashes to a great extent when compared with the conventional apparatus, and can be called a novel and superior larger type distillatory apparatus.

FIG. 7 is a diagrammatical view of another embodiment, the structure and functions of which can be explained as follows.

The steam generated in a steam generator 411 is preserved therein at a central opening portion of a leveling plate which separates said generator 411 into upper and lower portions, each portion being thus provided with an outlet on each side of the inner wall of the said generator 411, said steam is made to acutely detour said leveling plate and a mist separator means 414 enabling it to rise through said central opening portion and a central cylindrical portion following the direction of the arrows, and reaches a condenser 420 further passing through a piping 415. One end of said condenser whereat a steam inlet is provided is made to be lower than the other end, so that the steam entering from said inlet heats the water collected at a receiver 416, travels the upper part of a high temperature heat exchanger 420 carrying therewith the generated gas, and will be further condensed at a low temperature heat exchanger 413a. The water condensed at the high temperature heat exchanger 420 contains little impure gas, while the water condensed at the low temperature heat exchanger 413a is warmed up travelling a lower inner wall of the high temperature heat exchanger, gas therefrom being removed in the meantime, and accumlates in the receiver 416. Thus, the high-temperature high-purity distilled water is produced inside the condenser, and said distilled water is introduced into a cooler 413 passing through a piping 433. At such time, the cooling water which entered from an inlet nozzle 424 is raised in regard to its temperature, discharges from an outlet nozzle 425, enters the steam generator 411 passing through a piping 455, and enters a gas remover 431 after being heated with the heating tubes 493 provided in the steam generator 411. Further, the high-temperature high-purity distilled water led into the cooler 413 will be cooled maintaining its purity, and is led into a storage tank 441 by way of an analyzer A. The cooling water entering from an inlet nozzle 447 and discharging from an outlet nozzle 448 is in the meantime warmed up, enters the low temperature heat exchanger of the condenser passing through a piping 450, is further warmed up completely condensing the steam, however said temperature is lower than that of the cooling water issued from the said high temperature heat exchanger. A part of the heating steam is introduced into an aspirator 428 and forms a low pressure portion 429 inside the aspirator 428. The gas generated from the high temperature distilled water stored in said gas remover 431 will be absorbed into said low pressure portion 429 passing through a piping 426 and a check valve CVa. Consequently, the high temperature distilled water which has been fed of the readily vaporizable substances in the said gas remover 431 enters the said steam generator 411 passing through a piping 456 as a supply water. The high-purity distilled water is thus obtained efficiently as distillation is carried on by using the high temperature supply water containing only a little contaminant.

As described above, the gas remover is capable of removing gaseous body not only of the distilled water but also of the supply water. That is to say, provide two gas removers to an apparatus, have them perform gas removal of the supply water and the distilled water respectively, and the ultra high-purity distilled water can be produced without performing a re-distillation, that is, without the necessity of consuming a large amount of the vaporization heat.

It is readily possible for the persons skilled in the art to combine the particulars mentioned in the present specification in many ways as are required, however, the present invention is substantially including all the changes without running off the scope of the present invention.

What I claim is:

1. In a high-purity distilled water producing apparatus having a steam generator, a heater and a condenser, the improvement comprising mist separator means mounted in said steam generator, a tubular member connecting said steam generator with said condenser for introducing high-temperature steam free from mist into said condenser, receiving means adjacent the upper portion of said tubular member for collecting as liquid, steam condensed by the condenser, the upper portion of said tubular member in combination with the receiving means being adapted to transfer heat from the generated steam to the condensate resulting from the steam condensed by the condenser at substantially high temperature and collected by the receiving means, gas separating container means connected to the receiver means, gas aspirating means connected to the gas separating container means for continuously removing occluded gas therefrom, the mist separating means comprising a vaporization drum including a cover portion and a catcher supporting portion, baffle means within the drum, two hanging type liquid catchers bilaterally spaced from the center portion of said baffle means, said catchers being hangingly supported in the drum below the baffle means, a plurality of steam inlet openings in one of the liquid catchers, each of the two hanging type liquid catchers having an inclined bottom plate inclined toward the inner wall of the drum and an outlet in the bottom plate, first drain pipes depending from the openings in the bottom plates of the liquid catchers, steam separator piping in each of the hanging type liquid catchers for causing the steam to change its course about 180°, a condenser connected to one of the pipings, a heating boiler within the drum, second drain pipes within the drum below the first drain pipes, the second drain pipes returning separated liquid droplets to the boiler, a concentrated water overflows pipe extending downwardly alongside the vaporization drum from the side of the drum, and connecting piping extending from the bottom of the boiler and upwardly alongside the vaporization drum and extending within the overflow water pipe, the overflow water pipe being provided with a water discharged pipe whereby the water in the vaporization drum is maintained at the same level as the upper end of the connecting pipe.

2. The apparatus of claim 1 wherein the heater comprises a steam chest having vertical open ended heating tubes extending upwardly within the boiler and a direction converter comprising an inverted cone mounted within the drum above the heating tubes.

References Cited
UNITED STATES PATENTS

| | | | |
|---|---|---|---|
| 1,352,648 | 9/1920 | Beyer et al. | 159—31 |
| 1,831,887 | 11/1931 | Sieck, Jr. | 202—194 X |
| 2,610,142 | 9/1952 | Lawrence | 202—197 X |
| 2,857,979 | 10/1958 | Van Dijck | 55—523 X |
| 2,881,116 | 4/1959 | Siegfried | 203—40 X |
| 2,960,449 | 11/1960 | Williamson | 159—27 R X |
| 3,248,305 | 4/1966 | Williamson | 202—205 X |
| 3,251,752 | 5/1966 | Pugh | 203—10 X |
| 3,521,605 | 7/1970 | Eckstrom et al. | 122—34 |
| 3,660,246 | 5/1972 | Smith | 202—200 X |

FOREIGN PATENTS

| | | | |
|---|---|---|---|
| 613,737 | 10/1935 | Germany | 159—31 |

NORMAN YUDKOFF, Primary Examiner

J. SOFER, Assistant Examiner

U.S. Cl. X.R.

55—447; 122—491; 202—197, 202, 205